United States Patent
Zhu et al.

(10) Patent No.: US 10,210,289 B2
(45) Date of Patent: Feb. 19, 2019

(54) METHOD FOR DESIGNING THREE-DIMENSIONAL FREEFORM SURFACE TO BE USED IN DESIGN OF THE REFLECTIVE MIRRORS

(71) Applicants: Tsinghua University, Beijing (CN); HON HAI PRECISION INDUSTRY CO., LTD., New Taipei (TW)

(72) Inventors: Jun Zhu, Beijing (CN); Tong Yang, Beijing (CN); Xiao-Fei Wu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 516 days.

(21) Appl. No.: 14/832,503

(22) Filed: Aug. 21, 2015

(65) Prior Publication Data

US 2016/0232718 A1 Aug. 11, 2016

(30) Foreign Application Priority Data

Feb. 5, 2015 (CN) .......................... 2015 1 0060311

(51) Int. Cl.
*G06F 17/50* (2006.01)
*G06F 17/00* (2006.01)
*G06T 19/20* (2011.01)
*G06T 17/00* (2006.01)

(52) U.S. Cl.
CPC .......... *G06F 17/5009* (2013.01); *G06T 17/00* (2013.01); *G06T 19/20* (2013.01); *G06T 2219/2021* (2013.01)

(58) Field of Classification Search
CPC .. G06T 19/20; G06T 17/00; F06T 2219/2021; G06F 17/5009
USPC ........................................................... 703/1
See application file for complete search history.

(56) References Cited

U.S. PATENT DOCUMENTS

| 8,035,898 | B2 * | 10/2011 | Minano | G02B 27/0012 |
| | | | | 359/642 |
| 2005/0086032 | A1 * | 4/2005 | Benitez | G02B 27/0012 |
| | | | | 703/1 |
| 2013/0188199 | A1 * | 7/2013 | Endo | G01B 11/24 |
| | | | | 356/612 |

OTHER PUBLICATIONS

C. Hyatt-Woolf, "Charles the Optical Dictionary: An Optical and Ophthalmological Glossary of English". 1904. pp. 2.*
C. Hyatt-Woolf, "Charles the Optical Dictionary: An Optical and Ophthalmological Glossary of English". 1904. pp. 2. (Year: 1904).*

* cited by examiner

Primary Examiner — Kamini S Shah
Assistant Examiner — John E Johansen
(74) Attorney, Agent, or Firm — ScienBiziP, P.C.

(57) ABSTRACT

A method for designing three-dimensional freeform surface is provided. An initial surface and a first three-dimensional rectangular coordinates system are established. A number of feature rays are selected. A number of intersections of the feature rays with a first freeform surface are calculated, wherein the intersections are a number of feature data points. The first freeform surface is obtained by surface fitting the feature data points. An equation of the first freeform surface includes a conic term and a freeform surface term. The first freeform surface is taken as the initial surface for an iteration process.

9 Claims, 6 Drawing Sheets expressing the second freeform surface by a polynomial surface leaving out a conic surface term in the second three-dimensional rectangular coordinates system,, the second freeform surface is expressed:

$$z = f(x, y; P) = \sum_{j=1}^{J} P_j g_j(x,y)$$, wherein $g_j(x,y)$ is one item of a polynomial, and $P = (p_1, p_2, L, p_J)^T$ is the coefficient sets;

↓ acquiring a first sum of squares $d_1(P)$, of residual coordinate differences in z direction between the plurality of residual coordinate value $(x''_i, y''_i, z''_i)$ (i = 1, 2, ..., n) and the first freeform surface; and a second sum of squares $d_2(P)$, of modulus of vector differences between the plurality of residual normal vector $N_i = (\alpha''_i, \beta''_i, -1)$ (i = 1, 2, ..., n) and a normal vector of the first freeform surface

↓ obtaining an evaluation function P

↓ selecting different weightings w and setting a gradient $\nabla f(P)$ of the evaluation function equal to 0, to obtain a plurality of different values of P and a plurality of freeform surface shapes z = f (x, y; P) corresponding to each of the plurality of different values

↓ choosing a final freeform surface shape $\Omega_{opt}$ which has a best imaging quality from the plurality of freeform surface shapes z = f (x, y; P)

FIG. 3B fitting the plurality of feature data points $P_i$ (i=1, 2 ... K) to a sphere in the first three-dimensional rectangular coordinates system, and obtaining a curvature $c$ and a center of curvature $(x_c, y_c, z_c)$ corresponding to the curvature $c$ of the sphere

defining a feature data point $(x_o, y_o, z_o)$ corresponding to a chief ray of a central field angle among an entire field-of-view as a vertex of the sphere, and defining a second three-dimensional rectangular coordinates system by the vertex of the sphere as origin and a line passing through the center of curvature and the vertex of the sphere as a Z'-axis

transforming a plurality of first coordinates $(x_i, y_i, z_i)$ and a plurality of first normal vectors $(\alpha_i, \beta_i, \gamma_i)$, of the plurality of feature data points $P_i$ (i=1, 2 ... K) in the first three-dimensional rectangular coordinates system, into a plurality of second coordinates $(x'_i, y'_i, z'_i)$ and a plurality of second normal vectors $(\alpha'_i, \beta'_i, \gamma'_i)$, of the plurality of feature data points $P_i$ (i=1, 2 ... K) in the second three-dimensional rectangular coordinates system

surface fitting the plurality of feature data points $P_i$ (i=1, 2 ... K) into a conic surface in the second three-dimensional rectangular coordinates system, based on the plurality of second coordinates $(x'_i, y'_i, z'_i)$ and the curvature $c$ of the sphere, and obtaining a conic constant $k$

removing a plurality of third coordinates and a plurality of third normal vectors of the plurality of feature data points $P_i$ (i=1, 2 ... K), on the conic surface in the second three-dimensional rectangular coordinates system, from the plurality of second coordinates $(x'_i, y'_i, z'_i)$ and the plurality of second normal vector $(\alpha'_i, \beta'_i, \gamma'_i)$, to obtain a plurality of residual coordinates and a plurality of residual normal vectors; and surface fitting the plurality of residual coordinates and the plurality of residual normal vectors to obtain a second freeform surface; adding a first equation of the conic surface and a second equation of the second freeform surface, to obtain the equation of the first freeform surface

FIG. 3C

METHOD FOR DESIGNING THREE-DIMENSIONAL FREEFORM SURFACE TO BE USED IN DESIGN OF THE REFLECTIVE MIRRORS

CROSS-REFERENCE TO RELATED APPLICATIONS

This application claims all benefits accruing under 35 U.S.C. § 119 from China Patent Application No. 201510060311.1, field on Feb. 5, 2015 in the China Intellectual Property Office, disclosure of which is incorporated herein by reference. The application is also related to copending applications entitled, "METHOD FOR DESIGNING OFF-AXIAL OPTICAL SYSTEM WITH FREEFORM SURFACES", Ser. No. 15/011,640, filed Jan. 31, 2016.

BACKGROUND

1. Technical Field

The present disclosure relates to a method for designing three-dimensional freeform surface based on point-by-point construction and iteration process.

2. Description of Related Art

Compared with conventional rotationally symmetric surfaces, freeform optical surfaces have more degrees of freedom, which can reduce the aberrations and simplify the structure of the system in optical design. In recent years, with the development of the advancing manufacture technologies, freeform surfaces have been successfully used in the optical field, such as head-mounted-displays, reflective systems, varifocal panoramic optical systems, and micro-lens arrays.

However, conventional methods only consider the coordinates of the feature data points, but ignore the normal vectors of the feature data points, therefore, the shape of the freeform surfaces designed by conventional methods is inaccurate. Since the refraction and reflection of light are very sensitive to the normal vector of the freeform surfaces, conventional methods also reduce the optical performance of the systems using these freeform surfaces. Additionally, in conventional direct design methods, the freeform surfaces are designed by a direct construction method, the image quality of the freeform surfaces is generally low, and further optimization will be much more difficult.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
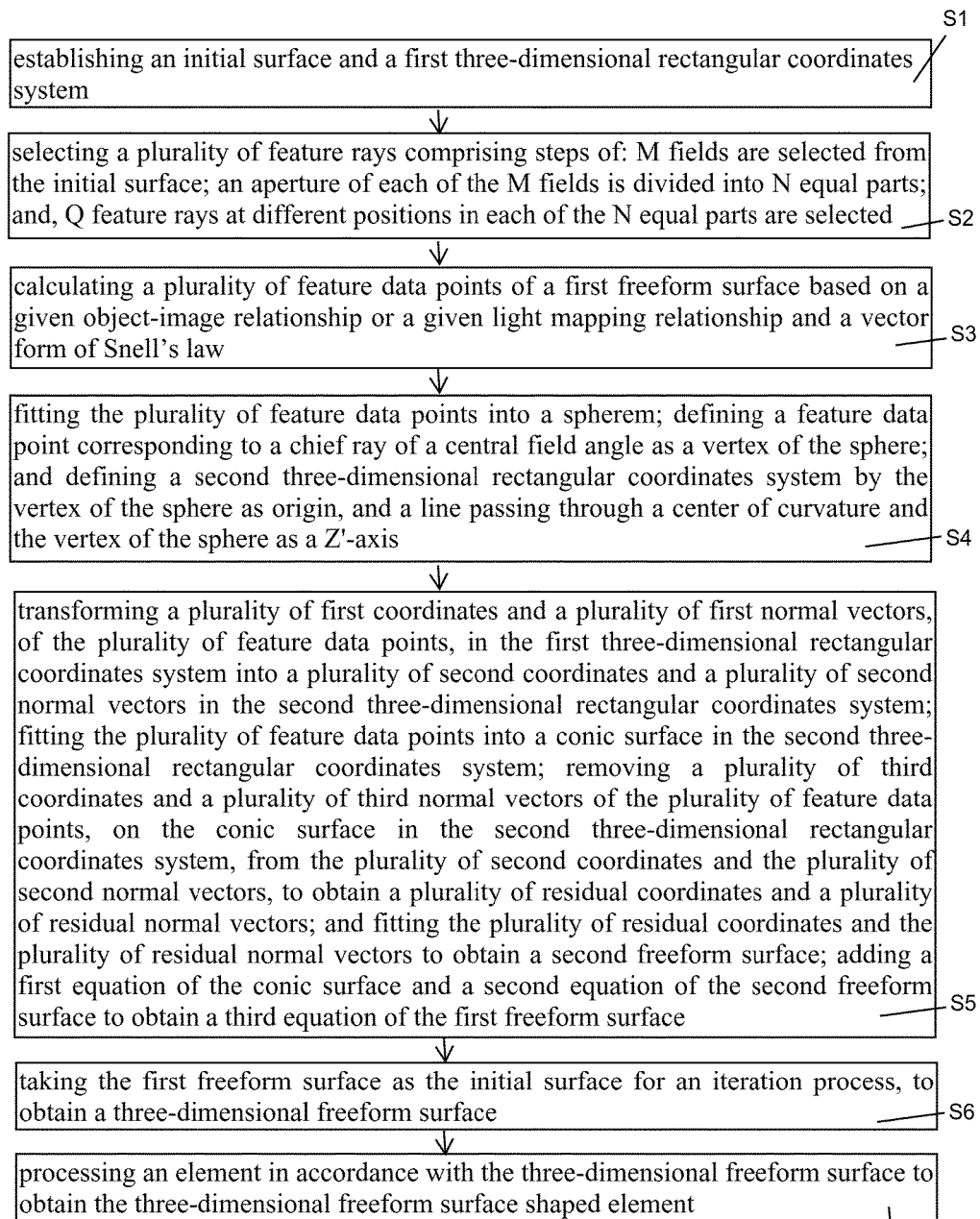
FIG. 1 shows a flow chart of one embodiment of a method for designing three-dimensional freeform surface.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series, and the like. It should be noted that references to "one" embodiment in this disclosure are not necessarily to the same embodiment, and such references mean at least one.

Referring to FIG. 1, a method for designing three-dimensional freeform surface of one embodiment is provided. The method includes the following steps: step (S1), establishing an initial surface;

step (S2), selecting a plurality of feature rays $R_i$ (i=1, 2 . . . K), and establishing a target surface;

step (S3), calculating a plurality of intersections of the plurality of feature rays $R_i$ (i=1, 2 . . . K) with a first freeform surface point by point based on a given object-image relationship or a given light mapping relationship and a vector form of the Snell's law, wherein the plurality of intersections are a plurality of feature data points $P_i$ (i=1, 2 . . . K);

step (S4), obtaining the first freeform surface by surface fitting the plurality of feature data points $P_i$ (i=1, 2 . . . K), wherein an equation of the first freeform surface includes a base conic term and a freeform surface term; and step (S5), taking the first freeform surface obtained in step (S4) as the initial surface for an iteration process, to obtain the three-dimensional freeform surface.

In step (S1), a first three-dimensional rectangular coordinates system is defined. In one embodiment, a propagation direction of beams is defined as a Z-axis, and the Z-axis is perpendicular to an XOY plane.

The initial surface can be planar, sphere, or other surface types. A location of the initial surface can be selected according to the optical system actual needs. In one embodiment, the initial surface is a plane.

In step (S2), a method of selecting the plurality of feature rays $R_i$ (i=1, 2 . . . K) includes: M fields are selected according to the optical systems actual needs, an aperture of each of the M fields is divided into N equal parts, and P feature rays at different aperture positions in each of the N equal parts are selected. As such, K=M×N×P different feature rays corresponding to different aperture positions and different fields are fixed. The aperture can be a circle, a rectangle, a square, an oval or other shapes.

Figure 2:
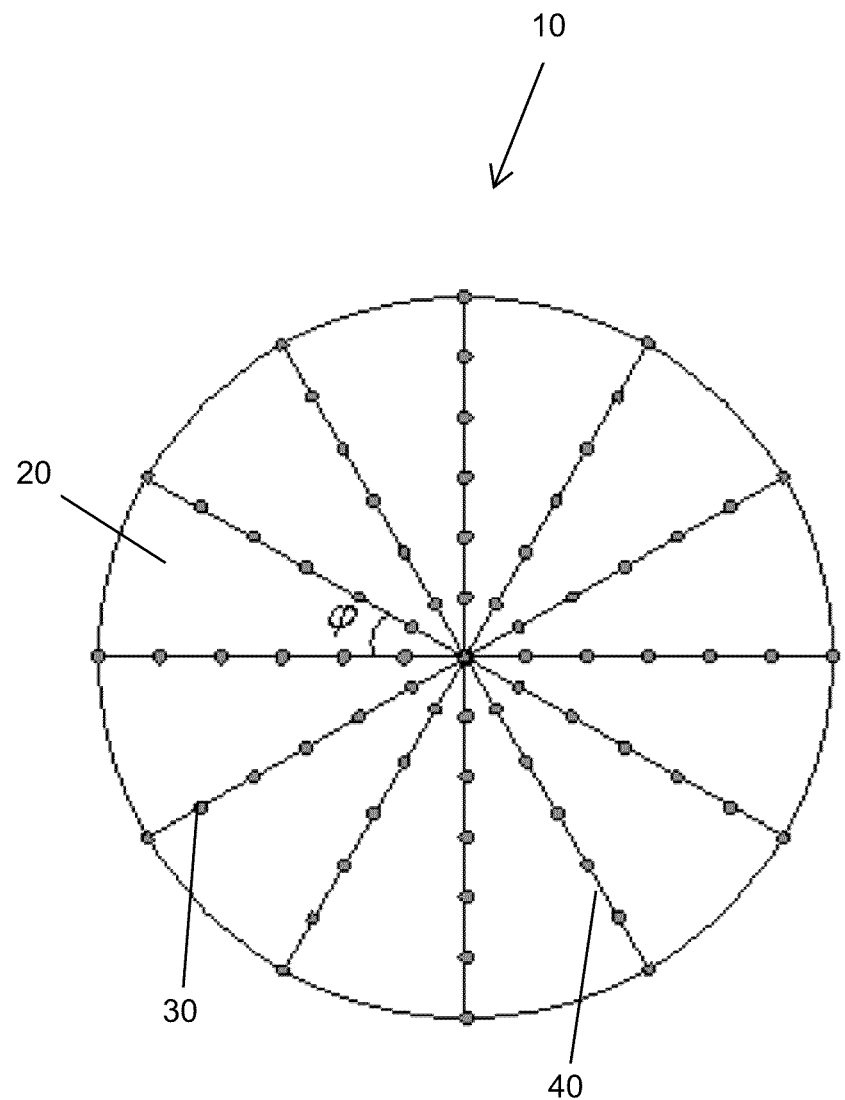
FIG. 2 is a schematic view of a selecting method of a plurality of feature rays employed in each field.

FIG. 2 illustrates that in one embodiment, the aperture of each of the M fields is a circle, and a circular aperture 10 of each of the M fields is divided into N angles 20 with equal interval φ, as such, N=2π/φ, and then, P different aperture positions 30 are fixed along a radial direction 40 of each of the N angles. Therefore, K=M×N×P different feature rays corresponding to different aperture positions and different fields are fixed.

Figure 3A:
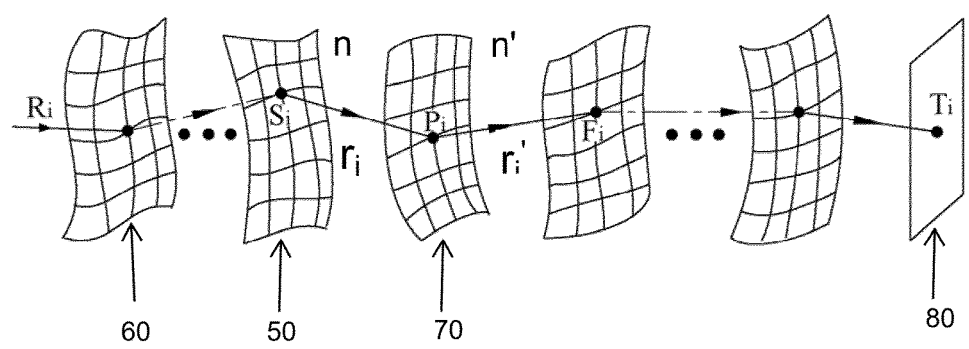
FIG. 3 is a schematic view of start point and end point of one feature ray while solving the feature data points.

In step (S3), referring to FIG. 3A, a surface 50 is defined as the first freeform surface, a surface 60 is defined as a surface located adjacent to and before the surface 50, and a surface 70 is defined as a surface located adjacent to and after the surface 50. The intersections of the plurality of feature rays $R_i$ (i=1, 2 ... K) with the surface 50 are defined as the feature data points $P_i$ (i=1, 2 ... K). The feature data points $P_i$ (i=1, 2 ... K) can be obtained by the intersections of the feature rays $R_i$ (i=1, 2 ... K) with the surface 60 and the surface 70. The plurality of feature rays $R_i$ (i=1, 2 ... K) are intersected with the surface 60 at a plurality of start points $S_i$ (i=1, 2 ... K), and intersected with the surface 70 at a plurality of end points $E_i$ (i=1, 2 ... K). When the surface 50 and the plurality of feature rays $R_i$ (i=1, 2 ... K) are determined, the plurality of start points $S_i$ (i=1, 2 ... K) of the feature rays $R_i$ (i=1, 2 ... K) can also be determined. The plurality of end points $E_i$ (i=1, 2 ... K) can be obtained based on the object-image relationship or given mapping relationship. Under ideal conditions, the feature rays $R_i$ (i=1, 2 ... K) emit from the plurality of start points $S_i$ (i=1, 2 ... K) on the surface 60; pass through the feature data points $P_i$ (i=1, 2 ... K) on the surface 50; intersect with the surface 70 at the plurality of end points $E_i$ (i=1, 2 ... K); and finally intersect with the image plane at the plurality of ideal target points $T_{i,ideal}$ (i=1, 2 ... K). If the surface 70 is the target plane 80, the plurality of end points $E_i$ (i=1, 2 ... K) are the plurality of ideal target points $I_i$ (i=1, 2 ... K). If there are other surfaces between the surface 50 and the target plane 80, the plurality of end points $E_i$ (i=1, 2 ... K) are the points on the surface 70, which make the first variation of the optical path length between the feature data points $P_i$ (i=1, 2 ... K) and their corresponding target points zero. $\delta S = \delta \int_{P_i}^{T_i} n ds = 0$, wherein ds is the differential elements of the optical path length along the plurality of feature rays $R_i$ (i=1, 2 ... K), n denotes the refractive index of the medium, and $\delta$ denotes a differential variation.

The plurality of feature data points $P_i$ (i=1, 2 ... K) can be obtained by the following two calculating methods.

A first calculating method includes the following substeps:

step (S31): defining a first intersection of a first feature ray $R_1$ and the initial surface as a feature data point $P_1$;

step (S32): when i (1≤K−1) feature data points $P_i$ (1≤i≤K−1) have been obtained, a unit normal vector $\vec{N}_i$ (1≤i≤K−1) at each of the i (1≤i≤K−1) feature data points $P_i$ (1≤i≤K−1) can be calculated based on a vector form of Snell's Law;

step (S33): making a first tangent plane at the i (1≤i≤K−1) feature data points $P_i$ (1≤i≤K−1) respectively; thus i first tangent planes can be obtained, and i×(K−i) second intersections can be obtained by the i first tangent planes intersecting with remaining (K−i) feature rays; and a second intersection, which is nearest to the i (1≤i≤K−1) feature data points $P_i$, is fixed from the i×(K−i) second intersections as a next feature data point $P_{i+1}$ (1≤i≤K−1); and step (S34): repeating steps S32 and S33, until all the plurality of feature data points $P_i$ (i=1, 2 ... K) are calculated.

In step (S32), the unit normal vector $\vec{N}_i$ (1≤i≤K−1) at each of the feature data point $P_i$ (1≤i≤K−1) can be calculated based on the vector form of Snell's Law. When the first freeform surface is a refractive surface, $$\vec{N}_i = \frac{n'\vec{r}_i' - n\vec{r}_i}{|n'\vec{r}_i' - n\vec{r}_i|} \quad (1)$$

$$\vec{r}_i = \frac{\overrightarrow{P_i S_i}}{|\overrightarrow{P_i S_i}|}$$

is a unit vector along a direction of an incident ray for the first freeform surface;

$$\vec{r}_i' = \frac{\overrightarrow{E_i P_i}}{|\overrightarrow{E_i P_i}|}$$

is a unit vector along a direction for an exit ray of the first freeform surface; and n, n' is refractive index of a media before and after the first freeform surface respectively.

Similarly, when the first freeform surface is a reflective surface, $$\vec{N}_i = \frac{\vec{r}_i' - \vec{r}_i}{|\vec{r}_i' - \vec{r}_i|} \quad (2)$$

The unit normal vector $\vec{N}_i$ at each of the plurality of feature data points $P_i$ (i=1, 2 ... K) is perpendicular to the first tangent plane at each of the plurality of feature data points $P_i$ (i=1, 2 ... K). Thus, the first tangent plane at each of the plurality of feature data points $P_i$ (i=1, 2 ... K) can be obtained.

The first calculating method includes a computational complexity formula of $$T(K) = \sum_{i=1}^{K-1} i(K-i) = \frac{1}{6}K^3 - \frac{1}{6}K = O(K^3).$$

When a large quantity of feature rays are used in a design, the first calculating method requires a long computation time.

A second calculating method includes the following substeps:

step (S'31): defining a first intersection of a first feature light ray $R_1$ and the initial surface as a feature data point $P_1$;

step (S'32): when an ith (1≤i≤K−1) feature data point $P_i$ (1≤i≤K−1) has been obtained, a unit normal vector $\vec{N}_i$ at the ith (1≤i≤K−1) feature data point $P_i$ (1≤i≤K−1) can be calculated based on the vector form of Snell's law;

step (S'33): making a first tangent plane through the ith (1≤i≤K−1) feature data point $P_i$ (1≤i≤K−1), and (K−i) second intersections can be obtained by the first tangent plane intersecting with remaining (K−i) feature rays; a second intersection $Q_{i+1}$, which is nearest to the ith (1≤i≤K−1) feature data point $P_i$ (1≤i≤K−1), is fixed; and a feature ray corresponding to the second intersection $Q_{i+1}$ is defined as $R_{i+1}$, a shortest distance between the second intersection $Q_{i+1}$ and the ith feature data point $P_i$ (1≤i≤K−1) is defined as $d_i$;

step (S'34): making a second tangent plane at (i−1) feature data points that are obtained before the ith feature data point $P_i$ (1≤i≤K−1) respectively; thus, (i−1) second tangent planes can be obtained, and (i−1) third intersections can be obtained by the (i−1) second tangent planes intersecting with a feature ray $R_{i+1}$; in each of the (i−1) second tangent planes, each of the third intersections and its corresponding feature data point form an intersection pair; the intersection pair, which has the shortest distance between a third intersection and its corresponding feature data point, is fixed; and the third intersection and the shortest distance is defined as $Q'_{i+1}$ and $d'_i$ respectively;

step (S'35): comparing $d_i$ and $d'_i$, if $d_i \le d'_i$, $Q_{i+1}$ is taken as the next feature data point $P_{i+1}$ ($1 \le i \le K-1$); otherwise, $Q'_{i-1}$ is taken as the next feature data point $P_{i+1}$ ($1 \le i \le K-1$); and step (S'36): repeating steps from S'32 to S'35, until the plurality of feature data points $P_i$ (i=1, 2 . . . K) are all calculated.

In step (S'32), a calculating method of the unit normal vector $\vec{N}_i$ at the ith ($1 \le i \le K-1$) feature data point $P_i$ ($1 \le i \le K-1$) is the same as the first calculating method.

A second calculating method includes a computational complexity formula of $$T(K) = \sum_{i=1}^{K-1} K - i + i - 1 = (K-1)^2 = O(K^2).$$

When a large quantity of feature rays are used in a design, the computational complexity of the second calculating method is much smaller than the computational complexity of the first calculating method.

In step (S4), the equation of the first freeform surface can be expressed as follows:

$$z(x, y) = \frac{c(x^2 + y^2)}{1 + \sqrt{1 - (1+k)c^2(x^2 + y^2)}} + \sum_{j=1}^{N} A_j g_j(x, y),$$

wherein $$\frac{c(x^2 + y^2)}{1 + \sqrt{1 - (1+k)c^2(x^2 + y^2)}}$$

is the conic term, c is the curvature of the conic surface at the vertex, k is the conic constant;

$$\sum_{j=1}^{N} A_j g_j(x, y)$$

is the freeform surface term, $A_i$ represents the $i^{th}$ term coefficient. The freeform surface term can be XY polynomials, Zernike polynomials, Chebyshev polynomials, or the like.

Referring to FIG. 3B, a method of surface fitting the plurality of feature data points $P_i$ (i=1, 2 . . . K) includes:

step (S41): surface fitting the plurality of feature data points $P_i$ (i=1, 2 . . . K) to a sphere in the first three-dimensional rectangular coordinates system, and obtaining a curvature c of the sphere and the center of curvature ($x_c$, $Y_c$, $z_c$) corresponding to the curvature c of the sphere;

step (S42): defining the feature data point ($x_o$, $y_o$, $z_o$) corresponding to a chief ray of the central field angle among the entire field-of-view (FOV) as the vertex of the sphere, defining a second three-dimensional rectangular coordinates system by the vertex of the sphere as origin and a line passing through the center of curvature and the vertex of the sphere as a Z'-axis;

step (S43): transforming the coordinates ($x_i$, $y_i$, $z_i$) and the normal vector ($\alpha_i$, $\beta_i$, $\gamma_i$), of the plurality of feature data points $P_i$ (i=1, 2 . . . K) in the first three-dimensional rectangular coordinates system, into the coordinates ($x'_i$, $y'_i$, $z'_i$) and the normal vector ($\alpha'_i$, $\beta'_i$, $\gamma'_i$), of the plurality of feature data points $P_i$ (i=1, 2 . . . K) in the second three-dimensional rectangular coordinates system;

step (S44): fitting the plurality of feature data points $P_i$ (i=1, 2 . . . K) into a conic surface in the second three-dimensional rectangular coordinates system, based on the coordinates ($x'_i$, $y'_i$, $z'_i$) and the curvature c of the sphere, and obtaining the conic constant k; and step (S45): removing the coordinates and the normal vector of the plurality of feature data points $P_i$ (i=1, 2 . . . K), on the conic surface in the second three-dimensional rectangular coordinates system, from the coordinates ($x'_i$, $y'_i$, $z'_i$) and the normal vector ($\alpha'_i$, $\beta'_i$, $\gamma'_i$), to obtain a residual coordinate and a residual normal vector; and fitting the residual coordinate and the residual normal vector to obtain a second freeform surface; the equation of the first freeform surface can be obtained by adding an equation of the conic surface and an equation of the second freeform surface.

Generally, the optical systems are symmetric about the YOZ plane. Therefore, the tilt angle θ of the sphere, in the Y'O'Z' plane of the second three-dimensional rectangular coordinates system relative to in the YOZ plane of the first three-dimensional rectangular coordinates system, is:

$$\theta = \arctan\left(\frac{y_o - y_c}{z_o - z_c}\right).$$

The relationship between the coordinates ($x'_i$, $y'_i$, $z'_i$) and the coordinates ($x_i$, $y_i$, $z_i$) of each of the plurality of feature data points $P_i$ (i=1, 2 . . . K) can be expressed as following:

$$\begin{cases} x'_i = x_i - x_o \\ y'_i = (y_i - y_o) \cos\theta - (z_i - z_o) \sin\theta \\ z'_i = (y_i - y_o) \sin\theta + (z_i - z_o) \cos\theta \end{cases}.$$

The relationship between the normal vector ($\alpha'_i$, $\beta'_i$, $\gamma'_i$) and the normal vector ($\alpha_i$, $\beta_i$, $\gamma_i$) of each of the plurality of feature data points $P_i$ (i=1, 2 . . . K) can be expressed as following:

$$\begin{cases} \alpha'_i = \alpha_i \\ \beta'_i = \beta_i \cos\theta - \gamma_i \sin\theta \\ \gamma'_i = \beta_i \sin\theta - \gamma_i \cos\theta \end{cases}.$$

In the second three-dimensional rectangular coordinates system, the coordinates and the normal vector of the plurality of feature data points $P_i$ (i=1, 2 . . . K) on the conic surface are defined as ($x'_i$, $y'_i$, $z'_{is}$) and ($\alpha'_{is}$, $\beta'_{is}$, $\gamma'_{is}$) respectively. The Z'-axis component of the normal vector is normalized to −1. The residual coordinate ($x''_i$, $y''_i$, $z''_i$) and the residual normal vector ($\alpha''_s$, $\beta''_s$, −1) can be obtained, wherein, ($x_i''$, $y_i''$, $z_i''$)=($x_i'$, $y_i'$, $z_i' - z_{is}'$) and $$(\alpha''_i, \beta''_i, -1) = \left(-\frac{\alpha'_i}{\gamma'_i} + \frac{\alpha'_{is}}{\gamma'_{is}}, -\frac{\beta'_i}{\gamma'_i} + \frac{\beta'_{is}}{\gamma'_{is}}, -1\right).$$

Referring to FIG. 3C, in step S(45), a method of surface fitting the residual coordinate and the residual normal vector includes:

step (S451): in the second three-dimensional rectangular coordinates system, expressing the second freeform surface by a polynomial surface leaving out the conic surface term, the second freeform surface can be expressed in terms of the following equation:

$$z = f(x, y; P) = \sum_{j=1}^{J} P_j g_j(x, y),$$

wherein $g_j(x,y)$ is one item of the polynomial, and $P=(p_1, p_2, L, p_j)^T$ is the coefficient sets;

step (S452): acquiring a first sum of squares $d_1(P)$, of residual coordinate differences in z' direction between the residual coordinate value $(x''_i, y''_i, z''_i)$ (i=1, 2, . . . , n) and the freeform surface; and a second sum of squares $d_2(P)$, of modulus of vector differences between the residual normal vector $N_i=(\alpha''_i, \beta''_i, -1)$ (i=1, 2, . . . , n) and a normal vector of the freeform surface, wherein the first sum of squares $d_1(P)$ is expressed in terms of a first equation:

$$d_1(P) = \sum_{i=1}^{I} [z_i - f(x''_i, y''_i; P)]^2 = (Z - A_1 P)^T (Z - A_1 P),$$

and the second sum of squares $d_2(P)$ is expressed in terms of a second equation:

$$d_2(P) = \sum_{i=1}^{I} \{[u_i - f_{x''}(x''_i, y''_i; P)]^2 + [v_i - f_{y''}(x''_i, y''_i; P)]^2\} =$$
$$(U - A_2 P)^T (U - A_2 P) + (V - A_3 P)^T (V - A_3 P)$$

wherein, $Z = (z_1, z_2, L, z_I)^T,$ $U = (u_1, u_2, L, u_I)^T,$ $V = (v_1, v_2, L, zv_I)^T,$ $$A_1 = \begin{pmatrix} g_1(x''_1, y''_1) & g_2(x''_1, y''_1) & \cdots & g_J(x''_1, y''_1) \\ g_1(x''_2, y''_2) & g_2(x''_2, y''_2) & \cdots & g_J(x''_2, y''_2) \\ \vdots & \vdots & & \vdots \\ g_1(x''_I, y''_I) & g_2(x''_I, y''_I) & \cdots & g_J(x''_I, y''_I) \end{pmatrix},$$

$$A_2 = \begin{pmatrix} g_1^x(x''_1, y''_1) & g_2^x(x''_1, y''_1) & \cdots & g_J^x(x''_1, y''_1) \\ g_1^x(x''_2, y''_2) & g_2^x(x''_2, y''_2) & \cdots & g_J^x(x''_2, y''_2) \\ \vdots & \vdots & & \vdots \\ g_1^x(x''_I, y''_I) & g_2^x(x''_I, y''_I) & \cdots & g_J^x(x''_I, y''_I) \end{pmatrix},$$

$$A_3 = \begin{pmatrix} g_1^y(x''_1, y''_1) & g_2^y(x''_1, y''_1) & \cdots & g_J^y(x''_1, y''_1) \\ g_1^y(x''_2, y''_2) & g_2^y(x''_2, y''_2) & \cdots & g_J^y(x''_2, y''_2) \\ \vdots & \vdots & & \vdots \\ g_1^y(x''_I, y''_I) & g_2^y(x''_I, y''_I) & \cdots & g_J^y(x''_I, y''_I) \end{pmatrix};$$

step (S453): obtaining an evaluation function, $$P = (A_1^T A_1 + w A_2^T A_2 + w A_3^T A_3)^{-1} \cdot (A^T_1 + w A_2^T U + w A_3^T V),$$

wherein w is a weighting greater than 0;

step (S454): selecting different weightings w and setting a gradient $\nabla f(P)$ of the evaluation function equal to 0, to obtain a plurality of different values of P and a plurality of freeform surface shapes z=f (x, y; P) corresponding to each of the plurality of different values of P; and step (S455): choosing a final freeform surface shape $\Omega_{opt}$ which has a best imaging quality from the plurality of freeform surface shapes z=f (x, y; P).

In step S5, the iteration process can be carried out by the following two methods.

A first method includes the following sub-steps: Firstly, a plurality of intersections of the plurality of feature rays $R_i$ (i=1, 2 . . . K) with the first freeform surface are defined as the feature data points $P'_i$ (i=1, 2, . . . , K), a unit normal vector at each of the feature data points $P'_i$ (i=1, 2, . . . , K) is calculated, and the feature data points $P'_i$ (i=1, 2, . . . , K) are surface fitted with the method in step S4, to obtain a third freeform surface, the first iteration is finished. Secondly, a plurality of intersections of the plurality of feature rays $R_i$ (i=1, 2 . . . K) with the third freeform surface are defined as the feature data points $P''_i$ (i=1, 2, . . . , K), a unit normal vector at each of the feature data points $P''_i$ (i=1, 2, . . . , K) is calculated, and the feature data points $P''_i$ (i=1, 2, . . . , K) are surface fitted with the method in step S4, to obtain a fourth freeform surface, the second iteration is finished. Repeating steps list above, until a plurality of actual intersections of the plurality of feature rays $R_i$ (i=1, 2 . . . K) with the target surface are close to the ideal target points, the iteration process is finished.

A second method includes the following sub-steps: Firstly, the first freeform surface generated by step S4 is taken as the initial surface, repeating step S3 and step S4, to obtain a fifth freeform surface, the first iteration is finished. Secondly, the fifth freeform surface is taken as the initial surface, repeating step S3 and step S4, to obtain a sixth freeform surface, the second iteration is finished. Repeating the iteration steps list above, until the plurality of actual intersections of the plurality of feature rays $R_i$ (i=1, 2 . . . K) with the target surface are close to the ideal target points, the iteration process is finished.

Compared to the second method, the first method is simpler and takes shorter time.

Figure 4:
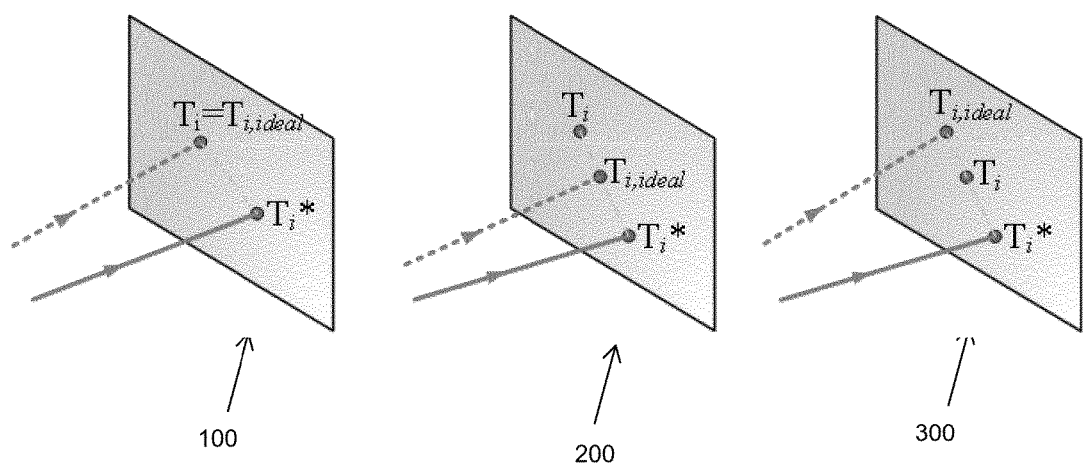
FIG. 4 shows a schematic view of one embodiment of types of the iterative process of three-dimensional freeform surface.

FIG. 4 illustrates that the type of the iteration can be normal iteration 100, negative feedback iteration 200, or successively approximation iteration 300. The negative feedback iteration 200 is faster. The successively approximation iteration is more stable.

In the normal iteration, the target point $T_i$ is the ideal target point $T_{i,ideal}$. $T_i = T_{i, ideal}$.

In negative feedback iteration, the negative feedback function can be written as:

$$T_i = \begin{cases} T_{i,ideal} + \varepsilon \Delta & \text{if } (T_{i,ideal} - T_i^*) > \Delta \\ T_{i,ideal} + \varepsilon(T_{i,ideal} - T_i^*) & \text{if } -\Delta \leq (T_{i,ideal} - T_i^*) \leq \Delta, \\ T_{i,ideal} - \varepsilon \Delta & \text{if } (T_{i,ideal} - T_i^*) < -\Delta \end{cases}$$

wherein $\varepsilon$ is the feedback coefficient, and $\varepsilon$ is larger than zero; $T_i^*$ is the actual intersections of the plurality of feature rays $R_i$ (i=1, 2 . . . K) with the target surface before the current iteration and after the previous iteration; $\Delta$ is a feedback threshold, and $\Delta$ is larger than zero, the feedback threshold is conducive to avoid instability of the iterative process caused by a dramatic change of $T_i$ due to large deviation between $T_i^*$ and $T_{i,ideal}$.

In the successively approximation iteration, $$T_i = T_i^* + \rho(T_{i,ideal} - T_i^*),$$

wherein $\rho$ is the approximation coefficient, and $\rho$ is larger than zero.

The method for designing three-dimensional freeform surface can be implemented via computer software.

The method for designing three-dimensional freeform surface can be used in design of the reflective or refractive mirrors, which can be used in various of optical imaging or illumination systems, such as off-axis reflective systems, head-mounted-displays, freeform illuminating lens, projection systems.

The method for designing three-dimensional freeform surface can have many advantages.

The method considers both the coordinates and the normal vectors of the plurality of feature data points, therefore, the shape of the three-dimensional freeform surfaces designed by the method is accurate. And the method can also improve the optical properties of the three-dimensional freeform surfaces.

Two three-dimensional rectangular coordinates systems are defined, after a sphere is obtained in the first three-dimensional rectangular coordinates system, the coordinates and the normal vector of the plurality of feature data points in the first three-dimensional rectangular coordinates system are transformed into the second three-dimensional rectangular coordinates system, then the three-dimensional freeform surface is obtained by surface fitting. The method is more precisely compared to conventional methods. And the three-dimensional freeform surfaces designed by the method accord with the general expression of the free surfaces.

The three-dimensional freeform surfaces are designed by iteration steps, the plurality of actual intersections of the plurality of feature rays $R_i$ (i=1, 2 . . . K) with the target surface are close to the ideal target points, therefore, the image quality of the three-dimensional freeform surfaces is high.

In another embodiment, further providing a method for designing or making lens with three-dimensional freeform surface. The method for designing or making lens includes the method for designing three-dimensional freeform surfaces described above.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for designing three-dimensional freeform surface to be used in design of the reflective comprising:

establishing an initial surface and a first three-dimensional rectangular coordinates system;

selecting a plurality of feature rays $R_i$ (i=1, 2 . . . K) by:
 selecting M fields from the initial surface;
 dividing an aperture of each of the M fields into N equal parts; and,
 selecting Q feature rays from different positions in each of the N equal parts, thus, K=M×N×Q different feature rays are selected;

calculating a plurality of feature data points $P_i$ (i=1, 2 . . . K) of a first freeform surface, point-by-point, based on a given object-image relationship or a given light mapping relationship and a vector form of Snell's law;

fitting the plurality of feature data points $P_i$ (i=1, 2 . . . K) into a sphere in the first three-dimensional rectangular coordinates system; defining a feature data point ($x_o$, $y_o$, $z_o$) corresponding to a chief ray of a central field angle among an entire field-of-view as a vertex of the sphere; and defining a second three-dimensional rectangular coordinates system by the vertex of the sphere as origin, and a line passing through a center of curvature and the vertex of the sphere as a Z'-axis;

obtaining a first equation of the first freeform surface comprising steps of:
 transforming a plurality of first coordinates ($x_i$, $y_i$, $z_i$) and a plurality of first normal vectors ($\alpha_i$, $\beta_i$, $\gamma_i$), of the plurality of feature data points $P_i$ (i=1, 2 . . . K), in the first three-dimensional rectangular coordinates system into a plurality of second coordinates ($x'_i$, $y'_i$, $z'_i$) and a plurality of second normal vectors ($\alpha'_i$, $\beta'_i$, $\gamma'_i$) in the second three-dimensional rectangular coordinates system;
 fitting the plurality of feature data points $P_i$ (i=1, 2 . . . K) into a conic surface in the second three-dimensional rectangular coordinates system;
 removing a plurality of third coordinates and a plurality of third normal vectors of the plurality of feature data points $P_i$ (i=1, 2 . . . K), on the conic surface in the second three-dimensional rectangular coordinates system, from the plurality of second coordinates ($x'_i$, $y'_i$, $z'_i$) and the plurality of second normal vectors ($\alpha'_i$, $\beta'_i$, $\gamma'_i$), to obtain a plurality of residual coordinates and a plurality of residual normal vectors;
 surface fitting the plurality of residual coordinates and the plurality of residual normal vectors to obtain a second freeform surface; and
 adding a second equation of the conic surface and a third equation of the second freeform surface to obtain the first equation of the first freeform surface, wherein the first equation of the first freeform surface is:

$$z(x, y) = \frac{c(x^2 + y^2)}{1 + \sqrt{1 - (1+k)c^2(x^2 + y^2)}} + \sum_{j=1}^{N} A_j g_j(x, y);$$

wherein, $$\frac{c(x^2 + y^2)}{1 + \sqrt{1 - (1+k)c^2(x^2 + y^2)}}$$

is a conic term, c is a curvature of the conic surface at the vertex, k is a conic constant;

$$\sum_{j=1}^{N} A_j g_j(x, y)$$

is a freeform surface term, and $A_i$ represents the $i^{th}$ term coefficient;

taking the first freeform surface as the initial surface for an iteration process, and obtain a three-dimensional freeform surface from both coordinates and the normal vectors of the feature data points, thus to improve the optical properties of the three-dimensional freeform surfaces for designing reflective mirrors.

2. The method of claim 1, wherein a relationship between the plurality of second coordinates $(x'_i, y'_i, z'_i)$ and the plurality of first coordinates $(x_i, y_i, z_i)$ satisfies the following equation:

$$\begin{cases} x'_i = x_i - x_o \\ y'_i = (y_i - y_o)\cos\theta - (z_i - z_o)\sin\theta \\ z'_i = (y_i - y_o)\sin\theta + (z_i - z_o)\cos\theta \end{cases};$$

wherein $\theta$ is a tilt angle of the sphere, in a Y'O'Z' plane of the second three-dimensional rectangular coordinates system relative to in a YOZ plane of the first three-dimensional rectangular coordinates system.

3. The method of claim 1, wherein a relationship between the plurality of second normal vectors $(\alpha'_i, \beta'_i, \gamma'_i)$ and the plurality of first normal vectors $(\alpha_i, \beta_i, \gamma_i)$ satisfies the following equation:

$$\begin{cases} \alpha'_i = \alpha_i \\ \beta'_i = \beta_i \cos\theta - \gamma_i \sin\theta \\ \gamma'_i = \beta_i \sin\theta + \gamma_i \cos\theta \end{cases},$$

wherein $\theta$ is a tilt angle of the sphere, in a Y'O'Z' plane of the second three-dimensional rectangular coordinates system relative to in a YOZ plane of the first three-dimensional rectangular coordinates system.

4. The method of claim 1, wherein in the second three-dimensional rectangular coordinates system, the plurality of third coordinates and the plurality of third normal vectors of the plurality of feature data points $P_i$ (i=1, 2 ... K) on the conic surface are defined as $(x'_i, y'_i, z'_{is})$ and $(\alpha'_{is}, \beta'_{is}, \gamma'_{is})$ respectively, the Z'-axis component of the plurality of residual normal vectors are normalized to −1, the plurality of residual coordinates $(x''_i, y''_i, z''_i)$ satisfy $(x''_i, y''_i, z''_i) = (x'_i, y'_i, z'_i - z'_{is})$, and the plurality of residual normal vectors $(\alpha''_s, \beta''_s, -1)$ satisfy $$(\alpha''_i, \beta''_i, -1) = \left(-\frac{\alpha'_i}{\gamma'_i} + \frac{\alpha'_{is}}{\gamma'_{is}}, -\frac{\beta'_i}{\gamma'_i} + \frac{\beta'_{is}}{\gamma'_{is}}, -1\right).$$

5. The method of claim 4, wherein a method of surface fitting the plurality of residual coordinates and the plurality of residual normal vectors comprises:

expressing the second freeform surface by a polynomial surface leaving out a conic surface term in the second three-dimensional rectangular coordinates system, the second freeform surface is expressed in terms of the following equation:

$$z = f(x, y; P) = \sum_{j=1}^{J} P_j g_j(x, y),$$

wherein $g_j(x,y)$ is one item of a polynomial, and $p = (p_1, p_2, \ldots p_J)^T$ is the coefficient sets;

acquiring a first sum of squares $d_1(P)$, of residual coordinate differences in z direction between the plurality of residual coordinate value $(x''_i, y''_i, z''_i)$ (i=1, 2, ..., n) and the first freeform surface; and a second sum of squares $d_2(P)$, of modulus of vector differences between the plurality of residual normal vector $N_i = (\alpha''_i, \beta''_i, -1)$ (i=1, 2, ..., n) and a normal vector of the first freeform surface, wherein the first sum of squares $d_1(P)$ is expressed in terms of a fourth equation:

$$d_1(P) = \sum_{i=1}^{I} [z_i - f(x''_i, y''_i; P)]^2 = (Z - A_1 P)^T (Z - A_1 P),$$

and the second sum of squares $d_2(P)$ is expressed in terms of a fifth equation:

$$d_2(P) = \sum_{i=1}^{I} \{[u_i - f_{x''}(x''_i, y''_i; P)]^2 + [v_i - f_{y''}(x''_i, y''_i; P)]^2\} =$$

$$(U - A_2 P)^T (U - A_2 P) + (V - A_3 P)^T (V - A_3 P)$$

wherein, $Z = (z_1, z_2, \ldots, z_I)^T$, $U = (u_1, u_2, \ldots, u_I)^T$, $V = (v_1, v_2, \ldots, v_I)^T$, $$A_1 = \begin{pmatrix} g_1(x''_1, y''_1) & g_2(x''_1, y''_1) & \cdots & g_J(x''_1, y''_1) \\ g_1(x''_2, y''_2) & g_2(x''_2, y''_2) & \cdots & g_J(x''_2, y''_2) \\ \vdots & \vdots & & \vdots \\ g_1(x''_I, y''_I) & g_2(x''_I, y''_I) & \cdots & g_J(x''_I, y''_I) \end{pmatrix},$$

$$A_2 = \begin{pmatrix} g_1^x(x''_1, y''_1) & g_2^x(x''_1, y''_1) & \cdots & g_J^x(x''_1, y''_1) \\ g_1^x(x''_2, y''_2) & g_2^x(x''_2, y''_2) & \cdots & g_J^x(x''_2, y''_2) \\ \vdots & \vdots & & \vdots \\ g_1^x(x''_I, y''_I) & g_2^x(x''_I, y''_I) & \cdots & g_J^x(x''_I, y''_I) \end{pmatrix},$$

$$A_3 = \begin{pmatrix} g_1^y(x''_1, y''_1) & g_2^y(x''_1, y''_1) & \cdots & g_J^y(x''_1, y''_1) \\ g_1^y(x''_2, y''_2) & g_2^y(x''_2, y''_2) & \cdots & g_J^y(x''_2, y''_2) \\ \vdots & \vdots & & \vdots \\ g_1^y(x''_I, y''_I) & g_2^y(x''_I, y''_I) & \cdots & g_J^y(x''_I, y''_I) \end{pmatrix};$$

obtaining an evaluation function, $$P = (A_1^T A_1 + w A_2^T A_2 + w A_3^T A_3)^{-1} \cdot (A_1^T Z + w A_2^T U + w A_3^T V),$$

wherein w is a weighting greater than 0;

selecting different weightings w and setting a gradient $\nabla f(P)$ of the evaluation function equal to 0, to obtain a plurality of different values of P and a plurality of freeform surface shapes $z = f(x, y; P)$ corresponding to each of the plurality of different values of P; and choosing a final freeform surface shape $\Omega_{opt}$ which has a best imaging quality from the plurality of freeform surface shapes $z=f(x, y; P)$.

6. The method of claim 1, wherein the iteration process comprises:
defining a plurality of first intersections of the plurality of feature rays $R_i$ (i=1, 2 . . . K) with the first freeform surface as a first feature data points $P'_i$ (i=1, 2, . . . , K), calculating a unit normal vector at each of the first feature data points $P'_i$ (i=1, 2, . . . , K), and fitting the first feature data points $P'_i$ (i=1, 2, . . . , K) by a same method of obtaining the first equation of the first freeform surface, to obtain a third freeform surface, a first iteration is finished;
defining a plurality of second intersections of the plurality of feature rays $R_i$ (i=1, 2 . . . K) with the third freeform surface as a second feature data points $P''_i$ (i=1, 2, . . . , K), calculating the unit normal vector at each of the second feature data points $P''_i$ (i=1, 2, . . . , K), and fitting the second feature data points $P''_i$ (i=1, 2, . . . , K) by a same method of obtaining a first equation of the first freeform surface, to obtain a fourth freeform surface, a second iteration is finished; and
repeating steps list above, until a plurality of actual intersections of the plurality of feature rays $R_i$ (i=1, 2 . . . K) with a target surface are close to a plurality of ideal target points, the iteration process is finished.

7. The method of claim 1, wherein the iteration process comprises:
taking the first freeform surface as the initial surface, and obtaining a fifth equation of the fifth freeform surface by a same method of obtaining a first equation of the first freeform surface, to obtain a fifth freeform surface, a first iteration is finished;
taking the fifth freeform surface as the initial surface, and obtaining a sixth equation of the fifth freeform surface by a same method of obtaining a first equation of the first freeform surface, to obtain a sixth freeform surface, a second iteration is finished; and
repeating the iteration steps list above, until a plurality of actual intersections of the plurality of feature rays $R_i$ (i=1, 2 . . . K) with a target surface are close to a plurality of ideal target points, the iteration process is finished.

8. A method for designing three-dimensional freeform surface to be used in design of the reflective mirrors comprising:
establishing an initial surface and a first three-dimensional rectangular coordinates system;
selecting a plurality of feature rays $R_i$ (i=1, 2 . . . K) comprising steps of:
selecting M fields from the initial surface;
dividing an aperture of each of the M fields into N equal parts; and,
selecting Q feature rays from different positions in each of the N equal parts, thus, K=M×N×Q different feature rays are selected;
calculating a plurality of intersections of the plurality of feature rays $R_i$ (i=1, 2 . . . K) with a first freeform surface, point-by-point, based on a given object-image relationship or a given light mapping relationship and a vector form of Snell's law, wherein the plurality of intersections are a plurality of feature data points $P_i$ (i=1, 2 . . . K);
obtaining the first freeform surface by surface fitting the plurality of feature data points $P_i$ (i=1, 2 . . . K), wherein an equation of the first freeform surface includes a conic term and a freeform surface term;
taking the first freeform surface obtained as the initial surface for an iteration process, and obtain the three-dimensional freeform surface from both coordinates and the normal vectors of the feature data points, thus to improve the optical properties of the three-dimensional freeform surfaces for designing reflective mirrors, wherein the iteration process comprises:
taking the first freeform surface as the initial surface, calculating a plurality of intersections of the plurality of feature rays $R_i$ (i=1, 2 . . . K) with a fifth freeform surface point by, point-by-point, based on a given object-image relationship or a given light mapping relationship and a vector form of Snell's law, wherein the plurality of intersections are a plurality of feature data points $P'_i$ (i=1, 2 . . . K); and obtaining the fifth freeform surface by surface fitting the plurality of feature data points $P'_i$ (i=1, 2 . . . K), wherein an equation of the fifth freeform surface includes a conic term and a freeform surface term; to obtain a fifth freeform surface, a first iteration is finished;
taking the fifth freeform surface as the initial surface, calculating a plurality of intersections of the plurality of feature rays $R_i$ (i=1, 2 . . . K) with a sixth freeform surface, point-by-point, based on a given object-image relationship or a given light mapping relationship and a vector form of Snell's law, wherein the plurality of intersections are a plurality of feature data points $P''_i$ (i=1, 2 . . . K); and obtaining the sixth freeform surface by surface fitting the plurality of feature data points $P''_i$ (i=1, 2 . . . K), wherein an equation of the sixth freeform surface includes a conic term and a freeform surface term; to obtain a sixth freeform surface, a second iteration is finished; and
repeating the iteration steps list above, until a plurality of actual intersections of the plurality of feature rays $R_i$ (i=1, 2 . . . K) with a target surface are close to a plurality of ideal target points, the iteration process is finished.

9. The method of claim 8, wherein a method of surface fitting the plurality of feature data points $P_i$ (i=1, 2 . . . K) comprises:
fitting the plurality of feature data points $P_i$ (i=1, 2 . . . K) to a sphere in the first three-dimensional rectangular coordinates system, and obtaining a curvature c and a center of curvature $(x_c, y_c, z_c)$ corresponding to the curvature c of the sphere;
defining a feature data point $(x_o, y_o, z_o)$ corresponding to a chief ray of a central field angle among an entire field-of-view as a vertex of the sphere, and defining a second three-dimensional rectangular coordinates system by the vertex of the sphere as origin and a line passing through the center of curvature and the vertex of the sphere as a Z'-axis;
transforming a plurality of first coordinates $(x_i, y_i, z_i)$ and a plurality of first normal vectors $(\alpha_i, \beta_i, \gamma_i)$, of the plurality of feature data points $P_i$ (i=1, 2 . . . K) in the first three-dimensional rectangular coordinates system, into a plurality of second coordinates $(x'_i, y'_i, z'_i)$ and a plurality of second normal vectors $(\alpha'_i, \beta'_i, \gamma'_i)$, of the plurality of feature data points $P_i$ (i=1, 2 . . . K) in the second three-dimensional rectangular coordinates system;
surface fitting the plurality of feature data points $P_i$ (i=1, 2 . . . K) into a conic surface in the second three-dimensional rectangular coordinates system, based on the plurality of second coordinates $(x'_i, y'_i, z'_i)$ and the curvature c of the sphere, and obtaining a conic constant k; and removing a plurality of third coordinates and a plurality of third normal vectors of the plurality of feature data points $P_i$ (i=1, 2 . . . K), on the conic surface in the second three-dimensional rectangular coordinates system, from the plurality of second coordinates $(x'_i, y'_i, z'_i)$ and the plurality of second normal vector $(\alpha'_i, \beta'_i, \gamma'_i)$, to obtain a plurality of residual coordinates and a plurality of residual normal vectors; and surface fitting the plurality of residual coordinates and the plurality of residual normal vectors to obtain a second freeform surface; adding a first equation of the conic surface and a second equation of the second freeform surface, to obtain the equation of the first freeform surface.

* * * * *